United States Patent Office 2,875,023
Patented Feb. 24, 1959

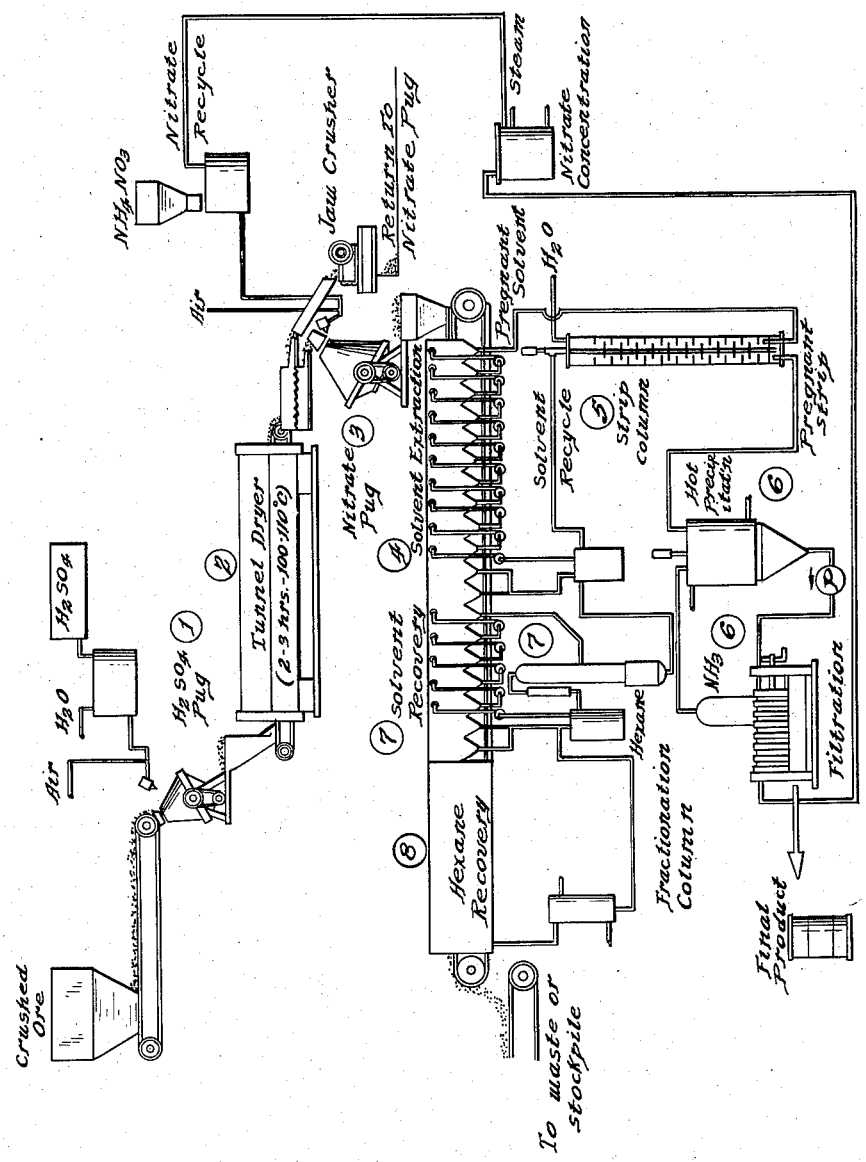

2,875,023

PROCESS OF RECOVERING URANIUM FROM ITS ORES

Paul Galvanek, Jr., Boston, Mass., assignor to the United States of America as represented by the United States Atomic Energy Commission Application November 30, 1956, Serial No. 625,566

6 Claims. (Cl. 23—14.5)

This invention relates to a process for recovering uranium from its ores and more particularly to a solvent leaching process for the production of high purity uranium products directly from low grade ores. By the utilization of both pugging and solvent leaching techniques, this process will obviate the problem of pulp clarification common to all other processes and, in addition, will substantially reduce or virtually eliminate the necessity for any further refining of the uranium oxide.

Previous to this invention, every commercial process for the recovery of uranium from its ores encountered problems in the separation of the aqueous uranium-bearing solution from the ore tailings. This problem of liquid-solid separation has been further accentuated by the fact that uranium-bearing ores, even from the same deposit, have had considerable variations in settling and filtration characteristics. Because of this variation in ores, the mills, in order to obtain clear liquors, have utilized many techniques of separation such as filtration, countercurrent decantation, percolation, and combinations thereof. Even in the resin-in-pulp ion exchange process where there is no necessity for a clear liquor, a sand-slime separation is effected by the use of drag classifiers and liquid cyclones.

This invention has as an object to provide a process for recovering uranium from low grade ores which will make it possible to obtain uranium concentrates of an exceedingly high grade of purity at the mill site. A further object is to provide a process for recovering uranium from its ores which is not beset with the liquid-solid separation difficulties which impede many commercial processes for recovering uranium from its ores. A still further object is to provide a process of recovering uranium from its ores which will yield a concentrate of such a high grade of purity that it will not have to be sent to a refinery and further purified. Other objects will appear hereinafter.

These objects are accomplished by the present invention. This new uranium recovery process will entirely eliminate operational difficulties inherently potential in a liquid-solid separation step. This present invention will also allow operators to obtain uranium concentrates of 99+ percent purity at the mill site; whereas, the usual procedure for the upgrading of uranium entails the production of a uranium oxide concentrate at the mill site, and the subsequent transportation of the concentrate to a refinery for further upgrading to a 99+ percent purity.

This novel process comprises the following steps as shown in the drawing:

(1) The crushed ore is mixed with sulfuric acid, water, and an oxidant if necessary. Water equivalent to only 5 to 30 percent by weight of the ore charge is used in this operation.

(2) The mixture of acid and ore is cured for approximately 2 to 3 hours at 100 to 110° C.

(3) The cooled, cured ore is nitrate-conditioned by mixing with an aqueous solution of ammonium nitrate. The amount of water used in this operation is again equivalent to only 5 to 30 percent of the original ore charge by weight, and replaces the water volatilized during the curing operation.

(4) The nitrate-conditioned, cured ore is then leached by percolating a hydrocarbon solution of tributyl phosphate through beds of this material. The solvent selectively extracts both uranium and nitric acid. This step can be accomplished by either continuous or batchwise countercurrent extraction. Apparatus similar to that developed for continuous percolation extraction of vegetable oils, as shown in U. S. Patent No. 2,686,192, has been found to be adaptable to this process.

(5) The pregnant solvent is contacted with water in a multi-stage system to strip the uranium and nitric acid into the aqueous phase. The barren solvent is recycled to the leaching operation (step 4) without further treatment.

(6) The aqueous strip solution is treated with ammonia to neutralize the nitric acid and precipitate uranium diuranate. The uranium precipitate is filtered, and the ammonium nitrate solution is recycled to the nitrate-conditioning operation (step 3) after adjustment of volume and nitrate concentration.

(7) The ore residue is washed free of adhering tributyl phosphate with a hydrocarbon solvent and this hydrocarbon solution of tributyl phosphate is then fractionated to yield the correct concentration for recycling to the leach operation described in step 4.

(8) The ore residue is stripped of hydrocarbon solvent, and discharged to waste disposal operations. If stockpiling is necessary for future recovery of other values, such as vanadium, the residue is suitably conditioned at this time.

The eight steps of the process mentioned above will now be discussed in detail.

Dissolution of the uranium minerals is accomplished in the first two steps of the process listed above. Pugging the crushed ore with sulfuric acid and water acts to open the ore and to convert the uranium to a soluble form as uranyl sulfate as well as to neutralize any lime the ore may contain. This pugging and curing treatment produces a damp, friable mass into which all of the acid solution has been absorbed. No free liquid phase remains, nor does a liquid phase separate on standing. The pugging operation involves mixing the crushed ore with sulfuric acid and water at approximately 80% solids, and then curing for 2–3 hours either at ambient temperature or at elevated temperature, depending on requirements for good uranium solubilization.

The solubilization can be accomplished either by curing at room temperature for extended periods, or at elevated temperatures for shorter periods. The present process normally employs a 2-hour cure at 100–110° C. As can be seen in Table I, the degree of uranium solubilization achieved by this method is comparable to that obtained by the more common aqueous leaching operations conducted at 40–60 percent solids.

TABLE I

*Uranium solubilization in acid-cured ores*

| Ore | Cure | $H_2SO_4$, Lb./T. | $H_2O$, Lb./T. | $NH_4NO_3$, Lb./T. | Percent $U_3O_8$ Solubilization |
|---|---|---|---|---|---|
| Lukachukai | 24 hrs., ambient | 260 | 200 | | 95 |
| Edgemont | do | 30 | 100 | | 95 |
| Do | 2 hrs., 110° C | 40 | 150 | | 97 |
| Arrowhead | do | 135 | 300 | | 96 |
| Jackpile | do | 110 | 200 | | 92 |
| Utex | do | 500 | 200 | 10 | 94 |

It is essential to realize that the efficiency of the solvent leaching process is limited by the degree of uranium solubilization in the acid-cure step, since only uranium that has been solubilized by this treatment is available to the solvent for extraction. Ores not amenable to the acid-cure technique cannot readily by treated by the present process.

The hot-cured, acid pugged ore is repulped at about 90% solids with an ammonium nitrate solution to convert the uranyl sulfate to uranyl nitrate. A damp, friable ore mass is thus produced. When the dry, acid-cured ore is mixed with an aqueous solution of ammonium nitrate, the soluble salts are dissolved, and the dehydrated ore mass is crumbled so that a relatively rapid flow of solvent through the ore beds is possible during the subsequent leaching operation. Ammonium nitrate equivalent to approximately 20 to 40 pounds per ton of ore is introduced in this operation. Test work has shown that up to 95 percent of the nitrate is available for recycle from the uranium precipitation step. After the cured ore is conditioned with ammonium nitrate solution in this way, substantially all of the solubilized uranium can be extracted by percolation leaching with a 5% solution of tributyl phosphate in kerosene or hexane.

The key to the practical application of tributyl phosphate for recovering uranium from low grade ores lies in the three initial steps of the process. By using the acid-cure method for the dissolution of the uranium, followed by the nitrate-conditioning operation, the quantity of aqueous phase involved is kept to a minimum. Thus the nitrate requirement for producing a suitable extraction environment, even in a sulfate system, is diminished to a level that is economically feasible. In order to have an extractant of suitable viscosity a 5% solution of tributyl phosphate in a hydrocarbon, such as hexane, octane, decane, or kerosene is used.

Although several methods of solvent leaching have been successfully employed, the percolation leach appears to be the most promising. The leaching operation is carried out simply by passing a tributyl phosphate solution upward through a bed of the nitrate-conditioned feed. Percolation rates of one bed void volume per hour are easily achieved through six-foot beds of the treated ore with a gravity head of only two to three feet. About 1000–1300 gallons of solvent are required per ton of ore.

All the solubilized uranium is extracted into approximately the first third of the effluent solvent. The leaching is continued until essentially all of the nitric acid has been extracted from the feed for later recycle. The first third of the pregnant solvent goes to the water-stripping step. The remaining effluent solvent, which is low in uranium content but rich in nitric acid, is percolated through a second bed of fresh feed. This unstripped solvent is followed by solvent drained from the first bed of leached charge, and finally by fresh solvent recycled from the water-stripping step. Thus the pregnant solvent is always high in uranium content and fairly constant in composition.

Unlike most organic extractants, tributyl phosphate solutions may be easily stripped of their uranium content. As a result of the relatively weak complexing action of this solvent, the stripping operation is effected by contacting the pregnant solvent with water. Both uranium and nitric acid are extracted into the aqueous phase, and the barren solvent is ready for recycle to the leaching operation. A batch countercurrent water strip employing five stages with an organic to aqueous volume ratio of 10 to 1 has been successfully used to produce aqueous solutions containing 20 to 30 grams per liter of both uranium and nitric acid. Similar solutions were produced in a continuous counter-current mixer-settler apparatus employing four stages and an organic to aqueous flow ratio of 4 to 1.

When the aqueous strip solution is neutralized with ammonia gas, the uranium is precipitated as ammonium diuranate, $(NH_4)_2U_2O_7$, and then may be collected by filtration. Analysis of the uranium oxide produced by calcination at 850° C. has indicated a purity of over 99 percent. A qualitative spectrographic analysis of a typical product is shown in Table II.

TABLE II

*Spectrographic analysis of a typical product*

| Impurity: | Percent found |
|---|---|
| Aluminum | <0.01 |
| Cadmium | 0.01–0.001 |
| Copper | 0.01–0.001 |
| Iron | 0.1–0.01 |
| Lithium | <0.001 |
| Magnesium | <0.001 |
| Manganese | 0.01–0.001 |
| Lead | <0.001 |
| Silicon | 0.01–0.001 |
| Thallium | <0.001 |

These elements were sought but not detected: Ag, As, B, Be, Bi, Cr, Ge, In, Mo, Na, P, Sb, Sn, Ti, V, Zn.

The solution from the filtration step contains all the nitrate extracted in the leaching operation, so that after volume adjustment, it can be recycled to the nitrate-conditioning operation to supply up to 95 percent of the nitrate requirements of the process. Thus as much as a tenfold reduction in nitrate consumption can be accomplished.

In Table III are shown the results of several batch percolation leach tests in which uranium and nitric acid were stripped from the solvent, the uranium was precipitated, and the resulting ammonium nitrate was recycled to the next leach test.

TABLE III

*Recovered nitrate for re-use*

| Cycle No. | $NH_4NO_3$ Lb./T. | Percent $U_3O_8$ Recovered | Percent $NH_4NO_3$ Recovered for Re-use |
|---|---|---|---|
| 1 | 32 | 88 | 95 |
| 2 | 32 | 88 | 91 |
| 3 | 33 | 90 | 70 |
| 4 | 40 | 87 | 94 |
| 5 | 40 | 92 | 89 |

As can readily be appreciated, the seventh and eighth steps of the process listed above are not necessary in order to recover uranium from the ore. These steps are of importance only for reasons of economy to avoid the loss of the solvent since it has been found that from 15 to 50 gallons of solvent adhere to each ton of leached ore residue. Various methods of solvent recovery have been employed such as water displacement, volatilization, steam distillation, and continuous centrifugation. Continuous centrifugation technique is the preferred method of solvent recovery. After centrifuging the ore residue contains 3 gallons or less of solvent per ton of dry ore.

The following examples illustrate but do not limit the invention.

EXAMPLE I

In order to illustrate the application of the tributyl phosphate solvent leaching process, a complete description of an actual cyclic run will be described. In the test to be described, each cycle involved the treatment of a 12.5-kg. charge of ore.

Arrowhead ore of the mudstone type was chosen for treatment since it presents a variety of difficulties to the two common acid processes for treatment of ore. The high bentonitic content of the ore makes it difficult to produce a clear liquor by filtration or other clarification techniques for column ion exchange. The high molybdenum content of the ore causes difficulty with the resin-in-pulp process.

The ore was ground to minus 35-mesh, and 12.5-kg. charges were mixed with the equivalent of 130 pounds of sulfuric acid and 300 pounds of water per ton of ore. The mixing, or pugging, was accomplished in a cement mixer by introducing the acid-water mixture over a period of approximately 5 minutes with an air-operated spray gun. The acid-treated ore was cured for 2-3 hours at 100-110° C. After cooling, the dried, cured ore was nitrate-conditioned by mixing with a solution equivalent to 35 pounds of ammonium nitrate and 300 pounds of water per ton of ore. The nitrate solution was also added by means of a spray gun over a period of approximately 5 minutes. Exceptionally uniform, finely dispersed pugs were consistently produced throughout the test.

The nitrate-conditioned feed was placed in a 5-inch diameter 6-foot length of Pyrex pipe. The ore was leached by percolating a 5% solution of tributyl phosphate in kerosene upward through the column at a rate equivalent to a residence time of approximately one hour. Freshly prepared solvent was used in the first cycle. In subsequent cycles, the last 70 percent of the effluent from the previous leach was percolated through fresh ore. This was followed by recycle solvent from the water stripping operation.

The pregnant solvent was stripped in a four-stage continuous countercurrent extraction system, which was operated at an organic to aqueous volume ratio of 4 to 1. Stripped solvent was recycled as described above. The aqueous strip solution, containing both uranium and nitric acid, was discharged into a heated precipitation vessel where excess ammonia gas was introduced continuously. The ammonium diuranate slurry thus formed was continuously discharged into a holding tank which was heated to facilitate coagulation of the precipitate. The product was collected on a filter and calcined at 850° C. Analysis of the leached ore residue yielded data from which nitrate losses were calculated.

Data summarizing the acid-cure efficiency, overall uranium recovery, and nitrate loss in the percolation leaching operation are presented in Table IV.

TABLE IV

*Cyclic percolation leaching of Arrowhead ore*

| Cycle No. | $H_2SO_4$, Lb./T. | $NH_4NO_3$ Lb./T. | Percent $U_3O_8$ | | $NH_4NO_3$ Loss | |
|---|---|---|---|---|---|---|
| | | | Solubilized | Recovered | Lb./T. | Percent |
| 1 | 130 | 35 | 94 | 94 | 6 | 17 |
| 2 | 130 | 35 | 96 | 93 | 2 | 6 |
| 3 | 130 | 35 | 96 | 95 | 2 | 6 |
| 4 | 130 | 35 | 94 | 95 | 4.5 | 13 |

The excellent overall uranium recoveries, ranging from 93 to 95 percent, show that substantially all the solubilized uranium was recovered in the leaching operation. Furthermore, relatively low nitrate losses of 2 to 6 pounds per ton of ore treated were encountered. Spectrographic analyses of the calcined products from the five cycles indicated a $U_3O_8$ content of over 99 percent.

The leached ore produced from this test was used in an evaluation of the continuous centrifugation method for solvent recovery. The ore residue after centrifugation contained about 3 gallons of adhering solvent per ton.

EXAMPLE II

Two thousand parts of −10 mesh Colorado Plateau ore containing 0.206% $U_3O_8$ were pugged with 130 parts of $H_2SO_4$ and 300 parts of water. The pugged ore was cured for 2 hours at 100-110° C. The cured material was repulped with a solution of 40 parts of ammonium nitrate in 200 parts of water. The repulped ore was percolation leached continuously and countercurrently with a solution of 5 volume percent tributyl phosphate in kerosene. The solvent retention time was approximately 50 minutes. The pregnant solvent was stripped countercurrently with water in a mixer-settler column using an organic:aqueous volume ratio of 20 to 1. The aqueous strip solution, containing both uranium and nitric acid, was then treated with ammonia gas to pH 8. The solution was filtered and the precipitate was calcined for 4 hours at 850° C. The filtrate containing ammonium nitrate was adjusted for concentration by evaporation and recycled into the second pug of a fresh charge of ore. In this example, the uranium and ammonium nitrate recoveries were 96 and 94 percent respectively, and $U_3O_8$ purity was 99+ percent.

This invention may be usefully applied to the recovery of high purity uranium from all ores, and particularly to those which are economically amenable to an acid treatment. Where there are ores presenting technical difficulties because of either ion exchange fouling or excessive slimes, this invention in whole or in part, may offer an excellent solution. In addition, the elimination of the necessity of further purification and associated processing costs thereof, will increase the value of the uranium oxide product obtained by this process.

The following features of this invention are believed to be novel:

(1) The use of ammonium nitrate to convert uranyl sulfate to uranyl nitrate.

(2) The use of a solvent composed of tributyl phosphate in an appropriate vehicle such as hexane or kerosene to leach or extract uranium nitrate from a pulp containing over 70% by weight of solids.

(3) A process consisting of (a) the conversion of uranium in the ore to uranyl sulfate, (b) the conversion of the uranyl sulfate to uranyl nitrate by the addition ammonium nitrate, (c) the leaching of the uranyl nitrate from a pulp containing more than 70% solids by the addition of a solvent composed of tributyl phosphate in a suitable diluent, (d) the stripping of the ammonium nitrate from the solvent by the addition of water, (e) the formation of ammonium di-uranate by the addition of ammonia to the uranyl nitrate solution.

The present invention has the following advantages over other processes for producing concentrates from uraniferous ores:

(1) No filtration or other clarification is necessary.

(2) Emulsion formation commonly encountered in liquid-liquid extraction systems does not occur.

(3) A concentrate of very high purity is obtained.

(4) Full-scale commercial installations using this solvent have found it to have excellent chemical stability, long recycle life, low water solubility, high selectivity, and a minimum of hazardous properties.

(5) The selection of tributyl phosphate as the extractant makes possible the easy recovery of uranium from the pregnant solvent with a water strip.

(6) The specificity of the solvent for uranium permits stockpiling of the leached ore for future recovery of other desirable constituents, such as vanadium, which remain in the ore residue.

Resort may be had to such modifications and variations as conform to the spirit of the invention and come within the scope of the appended claims.

I claim:

1. A process of recovering uranium values from an ore of uranium which comprises pugging said ore with sulfuric acid to solubilize the uranium therein as uranyl sulfate without the formation of a separate liquid phase, converting the uranyl sulfate in said pugged ore to uranyl nitrate by reaction with an aqueous solution of ammonium nitrate without the formation of a separate liquid phase, and extracting the uranyl nitrate from said nitrate conditioned ore with tributyl phosphate.

2. A process as set forth in claim 1 in which water is employed to strip the uranyl nitrate from the tributyl phosphate extract and the tributyl phosphate is recycled for reuse in the process.

3. A process as set forth in claim 2 in which the uranium is precipitated from the water stripping solution by reaction with ammonia and the ammonium nitrate solution thereby produced is recycled for reuse in the process for the nitrate conditioning of pugged ore.

4. A process of recovering uranium values from an ore of uranium which comprises pugging said ore with sulfuric acid, said ore constituting at least 70% of the mixture being pugged, curing the pugged mixture to complete the solubilization of the uranium values as uranyl sulfate, pugging said cured ore with a solution of ammonium nitrate to convert the uranyl sulfate in said cured ore to uranyl nitrate, said cured ore constituting at least 70% of the mixture being pugged, and leaching uranyl nitrate from the nitrate conditioned ore with an aliphatic hydrocarbon solution of tributyl phosphate.

5. A process as set forth in claim 4 in which the uranyl nitrate is stripped from its solution in tributyl phosphate by means of water and the tributyl phosphate solution is recycled for reuse in the process.

6. A process as set forth in claim 5 in which the uranium is precipitated from the water stripping solution by reaction with ammonia and the ammonium nitrate solution thereby produced is recycled for reuse in the process for the nitrate conditioning of cured ore.

References Cited in the file of this patent

UNITED STATES PATENTS

| | | |
|---|---|---|
| 2,506,945 | Thomas et al. | May 9, 1950 |
| 2,717,696 | Schubert | Sept. 13, 1955 |
| 2,733,126 | Spiegler | June 31, 1956 |

OTHER REFERENCES

Bartlett: U. S. Atomic Energy Comm., K–706, Feb. 27, 1951.